(No Model.) 2 Sheets—Sheet 1.
W. G. LENKER.
CALCULATING MACHINE.
No. 548,563. Patented Oct. 22, 1895.
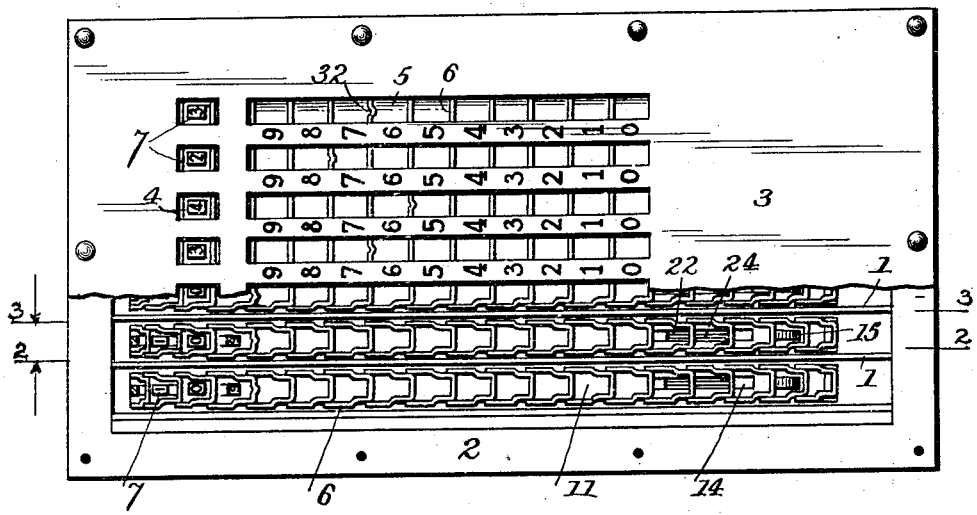
Fig. 1.
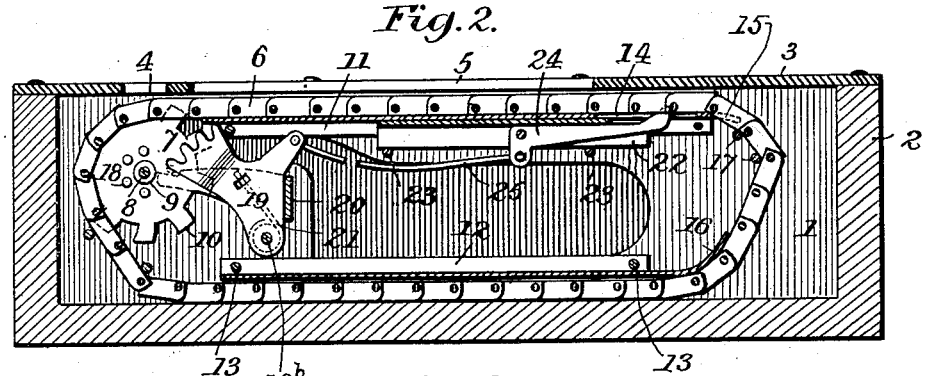
Fig. 2.
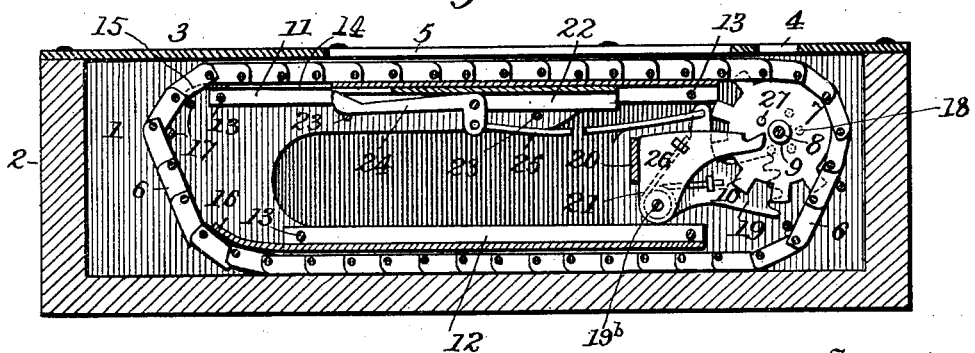
Fig. 3.
Witnesses
Jno G Hinkel
Will E. Neff
Inventor
Will G. Lenker
By  Attorney (No Model.) 2 Sheets—Sheet 2.

W. G. LENKER.
CALCULATING MACHINE.

No. 548,563. Patented Oct. 22, 1895.

Witnesses
Jno. G. Hinkel
Will E. Neff

Inventor
Will G. Lenker
By J. H. Watson, Attorney

ANDREW B. GRAHAM, PHOTO-LITHO. WASHINGTON, D.C.

UNITED STATES PATENT OFFICE.

WILL G. LENKER, OF SUNBURY, PENNSYLVANIA.

CALCULATING-MACHINE.

SPECIFICATION forming part of Letters Patent No. 548,563, dated October 22, 1895.

Application filed April 8, 1895. Serial No. 544,972. (No model.)

*To all whom it may concern:*

Be it known that I, WILL G. LENKER, a citizen of the United States, residing at Sunbury, in the county of Northumberland and State of Pennsylvania, have invented certain new and useful Improvements in Calculating-Machines, of which the following is a specification.

My invention consists in an adding-machine of improved construction, having as its principal features a series of toothed wheels, each of which has arranged around its periphery the digits from "0" to "9," inclusive; a series of chains by means of which the digit-wheels are rotated, and devices for carrying a unit of movement from each digit-wheel to the next one on the left when the wheel has made a complete rotation.

I shall now proceed to describe the invention in detail, reference being had to the accompanying drawings, in which—

Figure 4:
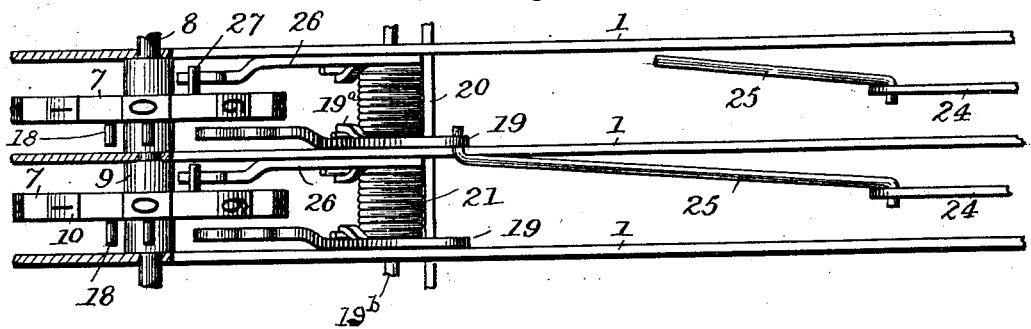
Figure 5:
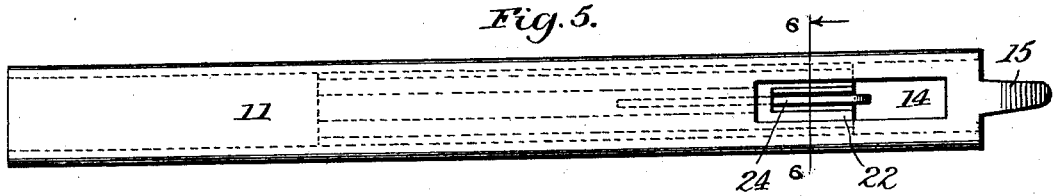
Figure 6:
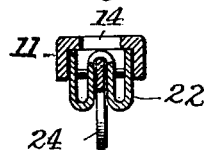
Figure 7:
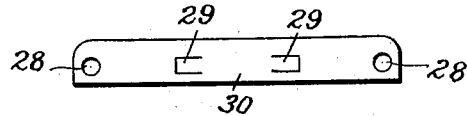
Figure 8:
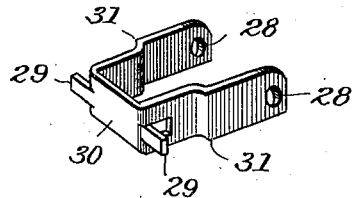

Figure 1 is a plan view of my improved machine, part of the cover-plate being broken away. Fig. 2 is a section on the line 2 2 of Fig. 1. Fig. 3 is a section on the line 3 3 of Fig. 1. Fig. 4 is an enlarged plan view of two of the digit-wheels and part of the carrying mechanism. Fig. 5 is a plan view of one of the supports for the chains. Fig. 6 is a section on the line 6 6 of Fig. 5. Fig. 7 shows a blank for one of the chain-links, and Fig. 8 shows a complete link in perspective and very much enlarged.

In my adding-machine the various parts are duplicated for each of the digit-wheels, and the devices for each digit-wheel are arranged in a cell, the various cells being separated by dividing-plates 1, all arranged in a suitable casing 2. The cover 3 of the casing has a series of openings 4, through which the top line of digits on the wheels 7 is visible, and a series of oblong openings 5, each equal in length to ten links of the chain 6, the openings 5 being located above the chains and permitting access to them, so that they may be moved from one to nine links by a pencil or other suitable device. The digit-wheels 7 are mounted on a shaft or rod 8, which in turn is mounted in the partition-plates 1. The digit-wheels are provided with hubs 9, which project in both directions and prevent lateral movement of the wheels. Each of the wheels is provided with ten teeth 10, marked consecutively with the Arabic numerals "0" to "9," inclusive.

The links of the chains 6 engage the teeth of the digit-wheels and move the wheels forward. The numerals "0" to "9," inclusive, are marked on the top 3 of the casing adjacent to the openings 5 and opposite the links of the chain, as shown in Fig. 1, to guide the operator in moving the chains. The upper portions of the chains are supported upon plates 11, which are U-shaped in cross-section, and the lower portions of the chains are guided by similar U-shaped plates 12. The plates 11 and 12 serve to space the partition-plates, and the entire series of cells for a given machine are held together by rods 13, which pass through the plates 11 and 12 and the partition-plates. The supporting-plates 11 are provided with slots 14, for a purpose to be explained later, and with tongues 15 at their forward ends, which serve as retaining-pawls to prevent backward movement of the chains. The lower plates 12 are provided at their rear ends with curved tongues 16, which serve to guide the chains and enable me to dispense with rollers opposite the digit-wheels, such as are commonly used in machines of this class. A pair of rods 17 are arranged below the pawls 15 for the double purpose of guiding the chain and holding it in proper relation to said pawls.

I shall now proceed to describe the tens-carrying mechanism. Upon the left side of each of the digit-wheels are a number of pins or teeth 18, which engage with teeth upon a lever 19, mounted upon a rod $19^b$, which is supported by the partition-plates. The number of pins 18 is immaterial, but it should correspond with the number of teeth in the lever 19. The pins are arranged only part way around the digit-wheel, there being a blank space which permits the lever to be thrown up against a stop 20 by a coiled spring 21 (see Figs. 2 and 4) once during each rotation of the digit-wheel. The spring 21 is mounted upon the rod $19^b$ and has an arm which engages a projection $19^a$ upon the cog-lever 19, said projection preferably consisting of a tongue stamped out of the metal, as shown. The stop 20 holds the lever in such position that the foremost pin 18 will engage its lowest tooth as the digit-wheel continues to rotate, and hence the lever 19 will be carried slowly downward and moved quickly upward once during each rotation.

Beneath each chain-support 11 there is a pawl-carriage 22, which is supported upon pins 23 and is free to slide longitudinally. A pawl 24 in the form of an elbow-lever is pivoted in the carriage 22. A short vertical arm of each pawl 24 is connected with an arm of the cog-lever 19 in the adjacent cell to the right by a rod 25, and the pawl proper is free to move upward through the opening 14 in the supporting-plate 11 to engage with the links of the chain. As the cog-lever 19 is drawn down by a digit-wheel, the pawl 24 in the adjacent cell to the left is drawn backward with its carriage and at the same time drawn down out of engagement with the chain. As soon as the cog-lever is released, it flies up against the stop 20, and as it rises it forces the pawl 24 first upward into engagement with a link of the chain and then forward, carrying the chain with it a distance of one link. At the end of its motion the momentum of the pawl-carriage will throw the pawl downward out of engagement with the chain, and the retaining-pawl 15 will hold the chain in its new position. In this manner as each digit-wheel moves from "9" to "0" the digit-wheel to the left is moved forward one point. While the cog-lever is in engagement with the digit-wheel the spring 21, by its action on the cog-lever, will tend to rotate the digit-wheel backward, thus keeping the upper portion of the chain stretched between the holding-pawl and the digit-wheel. To maintain this tension on the chain while the cog-lever is out of engagement with the digit-wheel, I provide a tension-lever 26, pivoted on rod 19$^b$, and seen in Figs. 3 and 4, which is normally held in engagement with the stop-bar 20 by means of an arm of the coiled spring 21, or any other suitably-arranged spring. As shown, the spring engages a projecting tongue upon the tension-lever. The tension-lever has an arm which is engaged by a pin or tooth 27 upon the right side of the digit-wheel, and which, as shown, is in the blank space not occupied by teeth 18 on the left side of the wheel. (See Figs. 2, 3, and 4.) The pin 27 engages the tension-lever just as the cog-lever 19 is released from the pins 18, and it exerts a backward tension upon the digit-wheel until it is again engaged with the cog-lever. In this manner there is always a backward tension upon the digit-wheels and the upper or visible section of the chain is always held in its proper position.

The division-plates 1 are cut away centrally, as shown in Figs. 2 and 3, so that the rods 25 may pass from one cell to the other to carry the movement from each digit-wheel to the next, as above described.

So far as the operation of most of the devices above described is concerned, I may use a chain of any suitable construction; but I prefer the chain illustrated, which is especially adapted for this purpose, and which is very simple and may be cheaply constructed.

Fig. 7 illustrates a blank for one link of the chain. It is provided near its ends with holes 28 to receive the pintles of the adjacent link in front, and with a pair of pintles 29, which engage the perforations 28 in the next link to the rear. These pintles 29 are in the form of tongues stamped out of the metal. These tongues are not weakened by bending, being permitted to remain in the plane of the central portion 30 of the blank. At the base of each tongue the blank is bent at right angles, forming a pair of wings 31, and these wings are formed with reversed curves, so that they are spaced wider apart at their outer ends than at their inner ends next the pintles. The links are connected in a chain by spreading the wings and passing the pintles of the next adjacent link through the perforations.

The operation of the machine is as follows: To set the digit-wheels at zero I turn each of them, so that the digit "9" is exposed by moving its chain the necessary amount, this movement being preferably made with a pencil. To facilitate this certain links of each chain are marked with a notch 32, (see Fig. 1,) and by bringing the notched link of any chain to zero on the casing its digit-wheel will be set at "9." After all the wheels are set with the nines exposed, the units-wheel or the one on the right is moved one point, carrying it to zero, and the carrying devices immediately throw all of the digit-wheels to the left to zero also. To add a column of numbers, the chains corresponding to the units, tens, hundreds, &c., are moved as many points as there are units, tens, hundreds, &c., in the first number, respectively. Then the operation is repeated for the second number of the column, and so on down the numbers of the column. The exposed numbers on the digit-wheels will always show the sums of the numbers which have been added. As any digit-wheel moves from "0" to "9" its cog-lever is drawn down, and the chain-feeding pawl 24 in the next cell to the left is drawn rearward. As the digit-wheel moves from "9" to "0" its cog-lever is released, and as it flies up it pushes the pawl 24 forward and feeds the chain in the next cell to the left one link forward, and consequently moves the next digit-wheel to the left one point, adding ten or one hundred, as the case may be, to the total sum.

While the carrying mechanism is in operation the digit-wheel is prevented from moving forward accidentally by the tension-lever 26.

It will be apparent that nearly all of the parts of my improved adding-machine may be stamped from sheet metal and made very cheaply.

While I have shown the preferred form of the invention, it is obvious that the design and arrangement of many of the parts may be varied without departing from the spirit of the invention; and, furthermore, that equivalents may be substituted for some of the elements. I do not therefore limit myself to the precise construction and arrrangement of parts illustrated and described.

What I claim is—

1. In a calculating machine, a pair of digit wheels and a corresponding pair of endless chains for operating said wheels, in combination with tens-carrying mechanism including a pawl operated by one digit wheel and operating directly upon the chain of the other digit wheel, whereby the latter digit wheel is moved forward, substantially as described.

2. In a calculating machine, a pair of digit wheels, in combination with a pair of chains adapted to move said wheels, a pawl arranged to engage and move one of the chains, a cog lever adapted to be moved by the digit wheel of the other chain and a connection between said lever and said pawl, substantially as described.

3. In a calculating machine, the combination with a pair of digit wheels and a pair of chains adapted to move said wheels, of a sliding carriage having a pawl mounted therein and arranged to engage and move one chain during the movement of the carriage in one direction, and a cog lever connected to the pawl, said cog lever being arranged to engage the digit wheel of the other chain during a portion of its rotation, substantially as described.

4. In a calculating machine, a pair of digit wheels, a pair of chains passing around said wheels, holding pawls for the chains arranged to prevent backward movement thereof, and means for creating a backward tension on the digit wheels, said holding pawls and digit wheels being at opposite ends of the machine, whereby the sections of chain included between them are retained under tension, substantially as described.

5. In a calculating machine, the combination with a digit wheel provided with pins or teeth of a cog lever engaging some of said teeth during a portion of the rotation of the wheel, and a tension lever arranged to engage some of said teeth during the remainder of the rotation of the wheel, whereby a backward tension of the wheel is maintained at all times, substantially as described.

6. In a calculating machine, series of cells formed by division plates, a digit wheel mounted in each cell, upper and lower spacing pieces 11, 12, connected with the plates, and chains passing around the digit wheels and over the upper spacing pieces, said upper spacing pieces and division plates serving to support and guide the chains respectively, substantially as described.

7. In a calculating machine, the combination with a pair of partition plates, of a digit wheel pivoted between said plates at the rear end of the machine, a chain passing over the digit wheel, said chain being guided between the partition plates, a support 11 for the upper portion of the chain, a curved guide 16 and pins 17 around which the chain passes at the forward end of the machine, a fixed tongue or pawl arranged to engage the links to prevent backward movement of the chain, and a movable pawl adapted to feed the chain forward, substantially as described.

8. A chain for calculating and similar machines consisting of a series of links, each link being integral throughout and consisting of two reversely curved arms 31 having perforations at their outer ends, a middle portion 30, and tongues or pintles 29, the arms 31 being bent at right angles to the portion 30 and the pintles being located at the ends of said portion and in line therewith, substantially as described.

In testimony whereof I affix my signature in presence of two witnesses.

WILL G. LENKER.

Witnesses:
 E. NEWTEN SHINDEL,
 J. HARRIS LENKER.